United States Patent [19]

Lundberg

[11] 4,441,028

[45] Apr. 3, 1984

[54] APPARATUS AND METHOD FOR MULTIPLYING THE OUTPUT OF A GENERATING UNIT

[76] Inventor: Robert M. Lundberg, 1350 Aster St., Apt. 12D, Chicago, Ill. 60610

[21] Appl. No.: 807,241

[22] Filed: Jun. 16, 1977

[51] Int. Cl.³ .............................................. F02C 9/00
[52] U.S. Cl. .................................. 290/52; 60/39.18 B
[58] Field of Search ................. 60/652, 655, 659, 398, 60/39.18 B; 290/52

[56] References Cited

U.S. PATENT DOCUMENTS

| | | | |
|---|---|---|---|
| 3,631,673 | 1/1972 | Charrier | 290/52 X |
| 3,643,426 | 2/1972 | Janelid | 60/659 |
| 3,831,373 | 8/1974 | Flynt | 60/39.18 B |
| 3,859,795 | 1/1975 | Frutschi | 60/652 |
| 3,935,469 | 1/1976 | Haydock | 290/52 |

FOREIGN PATENT DOCUMENTS

| | | | |
|---|---|---|---|
| 1065666 | 9/1952 | Fed. Rep. of Germany | 60/39.18 B |
| 1936559 | 1/1971 | Fed. Rep. of Germany | 60/39.18 B |
| 2332180 | 6/1973 | Fed. Rep. of Germany | 60/39.18 B |
| 2615439 | 4/1976 | Fed. Rep. of Germany | 60/652 |
| 562236 | 6/1944 | United Kingdom | 60/655 |
| 772287 | 4/1957 | United Kingdom | 60/39.02 |

Primary Examiner—G. Z. Rubinson
Assistant Examiner—W. E. Duncanson, Jr.
Attorney, Agent, or Firm—Emrich, Lee, Brown & Hill

[57] ABSTRACT

A power generating apparatus and method of operation for meeting a variable demand includes a compressor for supplying gas to a heat engine which generates power, and a reservoir positioned intermediate the compressor and heat engine. A portion of the power produced by the heat engine, which may be operated at an average rate of demand, is utilized to compress gas which is directed to the reservoir. The compressed reservoir of gas is selectively directed to the heat engine to increase the generation of power to satisfy increased rates of demand.

9 Claims, 11 Drawing Figures

APPARATUS AND METHOD FOR MULTIPLYING THE OUTPUT OF A GENERATING UNIT

BACKGROUND OF THE INVENTION

It is conventional practice, within the electric utility industry, to use energy conversion devices of various capital costs, various fuel and operating costs, which devices meet instantaneous demands from the aggregated customers. Such demand varies from hour to hour, day to day and seasonally. One proposal for attempting to solve the variable demand problem involves the employment of a gas turbine which is powered by fuel gas and compressed air from a reservoir. The reservoir is recharged periodically by a compressor driven by the motor or heat engine combination during off-load periods only. Such proposals are described in U.S. Letters Pat. Nos. 3,935,469 and 3,831,373, French Patent 1,209,726 and Canadian Patent 596,277. However, such proposals have not been acceptable to the utility industry, among other reasons, because of the electrical-electrical conversion losses inherent in compressing air from an electric system off-peak generation and the failure to conserve capital equipment. Additionally, efficient use of capital requires that expensive heat conversion apparatus operate above average customer demand and with lower than average operating costs, while inexpensive apparatus, utilizing high cost fuels, must operate below average customer demand.

The utility customer commonly varies his demands so as to average about 50%-60% of the available apparatus capability.

It is to the economic advantage of the individual utility and the nation to reduce capital costs, increase output of individual apparatus and use so far as possible local low cost fuels. Requirements of both operation and apparatus need to be met to satisfy these goals, requirements which have not been provided by conventional practice.

SUMMARY OF THE INVENTION

Accordingly, it is an object of the present invention to provide a method of and means for minimizing capital, fuel and operating costs in the generation of power or electricity.

It is one object of the present invention to provide an electric generating apparatus and method of operating same, having reduced equipment requirements operating continuously at a maximum useful output.

It is an object of the present invention to operate a generating unit continuously at high efficiency and at maximum load under varying demand utilizing low cost fuels, such as sulfur containing coal gasified continuously, thereby avoiding the use of premium fuels such as gas and oil, for costly start-up and shut-down.

It is a further object of the present invention to generate power on demand by operating at full capacity and constant input thereby avoiding thermal fatigue, while providing ease of control and simplicity of operation.

It is another object of the invention to provide a method of operating a generating unit with storage by processing compressed air from internal consumption of heat and continuing the process of generating electricity with the unit's heat conversion apparatus.

It is still a further object of the present invention to minimize losses in the generating unit due to partial load operation by operating continuously at maximum capacity while compressed air is stored and/or electricity is generated.

It is still another object of the present invention to provide greater use of coal through making practical and economic the use of complex, more efficient, electrical generating cycles, which become economic and practical by the use of compressed air inventory midway through the generating cycle and the constant continuous operation of the entire fuel processing train.

It is another object of the present invention to permit a nuclear reactor to supply heat to a generating unit at a continuous rate while generating electricity intermittently to permit the reactor to operate and be utilized in a more favorable mode at a more suitable capacity factor.

It is an object of the present invention to utilize a plurality of forms of fuels and heat supply apparatus such as a fluidized bed combustor, the use of recuperative or regenerative cycles, high sulfur coal, oil or solid wastes to generate power.

It is a further object of the present invention to provide means and method of intermittently or continuously generating current or compressing air into a storage reservoir.

And, it is an object of the present invention to provide process steam or by-product heat continuously while providing electricity at variable output dependant on demand In accordance with the present invention, present and future designs of energy conversion apparatus requiring the input of heated gases at high pressure, which may achieve this energy through thermal interchange or chemical reaction, may be arranged to maximize the operation of the fuel processing apparatus. The generating unit includes a heat engine and a fuel supply with a storage facility or reservoir positioned intermediate thereof for storing compressed air or other gases to produce mechanical, fluid or electrical power at times coincident with but also other than while storing air. For example: low BTU gasification apparatus and purification facilities may be operated continuously at or near maximum rating; fuel gas turbines which compress air for needed combustion and additional air which is stored; and also at the same or at a later time, fuel the same or other gas turbines, used without air compressors, but supplied with stored air, which thus provides mechanical or electrical power. By suitable design and sizing of the components, capital and fuel are conserved and conversion efficiency is enhanced.

In one embodiment electricity or mechanical output can be accomplished at full load for 50 percent of the time, while the entire fuel processing train is operated at full capacity 24 hours per day, thus reducing the size of the fuel supply components. The entire fuel supply, the generating unit, and the storage facility comprise a self-contained peaking or cycling unit in which major portions of the unit operate at base load, an operating method which increases the efficiency of the conventional components of the plant.

Additionally, the present invention provides a method of integrating the operation and design of an electric generating plant which enables the designer to reduce the size of a maximum number of individual components of the proposed plant and thus increase the use of such components. This improves the use of capital, conserves resources such as materials and fuel, and raises the efficiency of the resultant plant.

The present invention further includes a method of and means for meeting users irregular requirements for power or electricity by partially processing energy and storing this energy as a compressed gas in the reservoir and subsequently completing the production of electricity upon demand, thus making it possible to operate nearly all production items at or near full capacity continuously.

Also, the present invention provides a method of and means for conserving thermal energy, fuel and capital through the design and operation of an energy conversion unit which develops power or work upon demand at intermediate or peaking capacity factors. The conversion unit operates at a heat input of substantially a capacity factor of 100 percent while continuously maintaining all high temperature parts under high temperature condition. By proper use of a gas storage reservoir intermediate the overall process, the entire fuel supply, generating unit, and the storage reservoir comprise a selfcontained peaking or cycling unit in which nearly all components of the plant operate at substantially full load, an operating condition which increases the overall efficiency of the essential components of the plant. Furthermore, in the present method, gas which is compressed and sent to storage must be compressed anyway in order to produce electricity using the heat apparatus of the invention regardless of storage. Therefore, the storage reservoir acts as a warehouse for partially processed energy indigenous to the process and as a time delay mechanism. Thus, the present invention utilizes approximately one-half to two-thirds of the energy required to produce electricity to make and store compressed air then utilizes the remainder of the energy combined with the energy in the stored air to produce electricity. In the practice of the present invention, electricity is not produced twice.

DETAILED DESCRIPTION

Figures 1, 2:
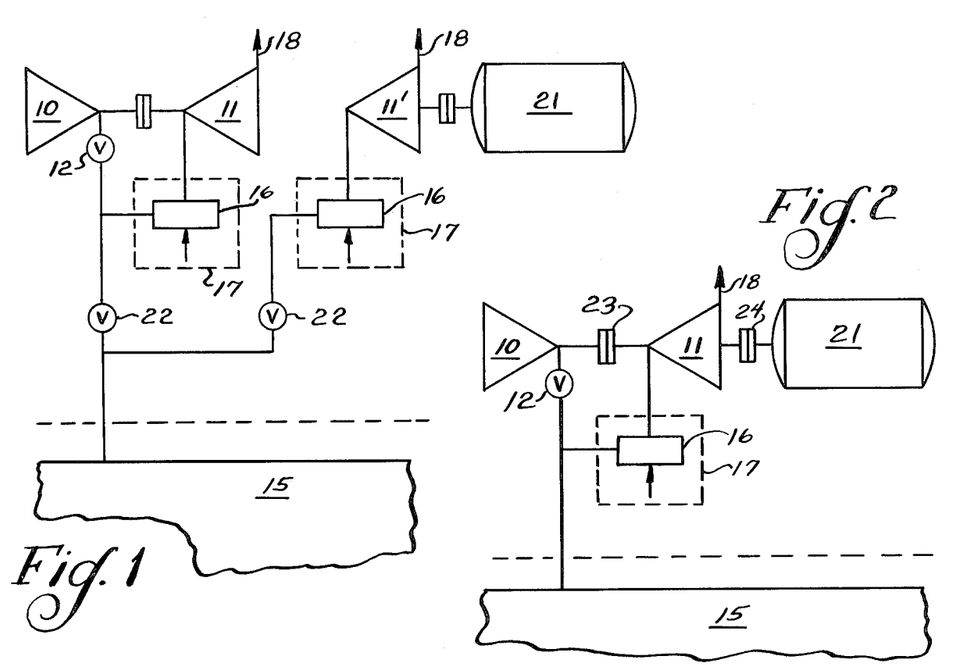
FIG. 1 is a schematic drawing of a simple cycle, power generating unit in accordance with the present invention employing separate gas turbines for compressing air to storage and for generating current.
FIG. 2 is a schematic drawing of one embodiment of the simple gas turbine cycle application in accordance with the present invention with a single heat or fuel input and a single gas turbine used for compressing and generating.

Referring now to the drawings wherein like numerals have been used throughout the several views to designate the same or similar parts, FIG. 1 illustrates a simple cycle power generating unit or apparatus in accordance with the present invention.

1. Air Supply

An axial or centrifugal air compressor 10 is rotated by the gas turbine 11 and may be varied in output from full to minimum output of air by suitable controls. The compressor serves to take atmospheric air and compress said air to a suitable pressure for the plant process. A shut off valve or check valve 12 is provided to prevent back flow through the compressor 10. Suitable isolation of the compressor 10 and gas turbine 11 from the storage facility or reservoir 15 is required whenever air is not being supplied to or withdrawn from the reservoir.

The compressor 10 operates to supply that air required to process the fuel and combust the fuel in burner 16 and drive air into the storage reservoir 15. In some configurations, the compressed air may be used as a heat exchange medium transferring heat to a heat engine via a heat exchanger 17, as shown in dotted lines of FIG. 1.

2. Fuel and Heat Utilization

Compression of air and the combustion of fuel produce heat and deliver pressurized gases from the burner 16 which rotates the gas turbine 11 and gases from this combustion are exhausted to the atmosphere through duct or conduit 18. Alternatively, a heat exchanger 17 instead of a burner 16 may be used and a heat engine may be powered by the heated air.

As shown in FIG. 1, two gas turbines 11 and 11' and two burners 16 or heat exchangers 17 are used in this embodiment of the present invention. Later embodiments perform essentially all of the functions of this embodiment using a single heat source and a single heat engine with clutching and/or cooling arrangements, as will hereinafter be described.

3. Generation

A conventional electric generator 21 is driven at constant speed by the rotation of gas turbine 11'. As described under air supply supra, the output of the generator 21 may be varied from full to zero or may be shut down. Again the equipment must be isolated, by valves 22 and 22' from the air reservoir 15 when air is not required.

4. The Combined System

Considering only the simple cycle plant, as shown in FIG. 1; for a given fuel input to the gas turbine 11; the gas turbine 11 connected to the air compressor 10 will drive an air compressor or air compressors of special size, which are approximately 50% larger than provided with conventional units. The second gas turbine 11' will drive an electrical generator 21 approximately 300 percent larger than that of the conventional plant. This configuration, if operated at constant heat input to the combined gas turbines, will theoretically produce electricity at 3 times the rate for one-third of the operating hours, provided air is compressed at a maximum rate and the excess is stored for two-thirds of the operating cycle.

One representative cycle of operation of FIG. 1 may be described as follows: Fuel at a maximum designed rate is burned in burner 16 thereby driving the gas turbine 11 which delivers full power to the air compressor 10 which supplies compressed air to the burner 16 and to the storage reservoir 15 and to process fuel, as will be discussed later in conjunction with FIG. 4. Should a demand for electrical power occur, the second gas turbine 11' connected to the electrical generator 21 is started using compressed air from storage reservoir 15 and fuel supplied to burner 16 or interchangeably with heat exchanger 17. Because one of the major objects of the present invention is the conservation of fuel or heat and capital equipment, it will be necessary to reduce the work done by the air compressor 10 to permit the electrical generator 21 to be loaded. The generator gas turbine 11' may be completely supplied with air from storage reservoir 15 for a portion of the time or the unit can be run indefinitely at a condition representing normal full load of the non-storage unit but now operating at approximately one-third the maximum output of this particular embodiment of the invention.

For maximum savings, it is desirable to operate the entire fuel and heat utilization portions of the plant at undiminished maximum input, the load being divided between compressing air and generating electricity. If the compressor 10 and gas turbine 11 fail to receive power through disconnection, the check valve 12 will close and the compressor and gas turbine will be shut down. As the demand for power decreases, the compressor-gas turbine unit can be started and air may again be supplied by the compressor 10 until, as the electrical load is reduced, air becomes available for storage and the generator 21 and associated gas turbine can be shut down.

Although control valves, not shown, will be supplied with the gas turbines, normal or conventional gas turbine-compressor-electrical generator combinations are not generally exposed to pressure after shut-down, valves 22 are shown merely to indicate the unusual conditions which might demand additional shut-off protection.

Now referring to FIG. 2, a second embodiment of the simple cycle gas turbine application with storage is described as follows.

1. Air Supply

Air compressor 10 is either rotated continuously at constant speed by the gas turbine 11 or varied in output from full to zero output of compressed air or disconnected via coupling or clutch means 23. The compressor 10 serves to take atmospheric air and compress the air to a suitable pressure for the plant process. Again, a check valve 12 is provided to prevent back flow through the compressor 10 when the compressor is not supplying air.

The compressor 10 operates to supply the air required to process the fuel and to combust the fuel in burner 16 and supply compressed air to the storage reservoir 15. Additionally in some configurations, the compressed air may be used as a heat exchange medium transferring energy to a heat engine 11 via a heat exchanger 17, as shown in dotted lines in FIG. 2.

2. Fuel and Heat Utilization

Compressed air and the combustion of fuel produce heat and deliver pressure from burner 16 which rotates gas turbine 11 and gases from this combustion are delivered to the atmosphere through duct or conduit 18.

3. Generation

As shown in FIG. 2, a conventional electric generator 21 is driven at constant speed by the common shaft through compressor 10 and gas turbine 11. The output of the generator may be varied from full to zero output of generation of electricity or disconnected via coupling or clutch means 24.

4. The Combined System

Considering the integration of the three elements, air supply, fuel and heat utilization and electrical generation, as illustrated in FIG. 2, the turbine compressor coupling means 23 and the turbine-generator coupling means 24 have been shown for ease of explanation, although it is a superior and practical option to provide cooling for the no load requirements of both the air compressor 10 and the generator 21 and to operate them continuously. Furthermore, it is not essential to the method of operation that the air compressor 10 and generator 21 be connected to the same heat engine 11 because it is understood that the same functions may be carried out by a heat engine driving a compressor unit and by a different heat engine driving a generator. For a combined cycle plant, each of these heat engines may be one-half the size of a conventional heat engine 11. As will be discussed infra, one object of the present invention is to conserve capital costs and FIG. 2 incorporates one such savings, that is, using one gas turbine alternatively for both functions, compressing and generating. FIG. 2 also illustrates a configuration whereby the gas turbine 11 may be shut down upon each change in demand, and the compressor 10 disconnected if electricity is demanded. The generator 21 may be connected and the unit again started. Also, as is well understood, the present invention reduces losses incurred due to such operation.

One cycle of operation of FIG. 2 may be described as follows: Fuel at a maximum designed rate is burned in burner 16 thereby driving the gas turbine 11 while coupling 23 delivers full power to the air compressor 10 which supplies air to the burner 16 and to storage reservoir 15 and to process fuel, as will be discussed infra in conjunction with FIG. 4. Meanwhile coupling 24 is not allowing any delivery of power to the electrical generator 21. Should a demand for electrical power occur, coupling 24 will transmit and coupling 23 will discontinue to conduct power. Thus, the generator 21 will be loaded and the compressor 10 unloaded. As the compressor 10 fails to receive power, the check valve 12 will close and compressed air from storage reservoir 15 will supply the combustion requirements of the gas turbine 11 with the entire fuel and heat utilization portion of the plant continuing to operate at undiminished capacity. Should the demand for electricity cease, coupling 23 permits power to be transmitted to the air compressor 10 wherein check valve 12 will open and the compressor will again be supplying air for combustion and to storage.

The description of the present invention has not been burdened with the constructional details as to the operative connections between the compressor, the gas and steam turbines, and the generator, because such apparatus are well known to persons skilled in the art and, the word "compressor", is merely representative of one type of work zone where the output thereof may be transmitted, stored and later transformed into useful work. Although the air compressor 10 is shown as directly connected to the system or apparatus, it is within the scope of the present invention that the compressor may be driven at higher or lower speeds, if necessary, through the use of a gear box.

Additionally, sound engineering design and practice require the addition of conventional details which are not included on the drawings, such as, fuel supplies, steam required for gasification reactions, intercooling and aftercooling provisions about the air compressor 10, requirements for maximum safe operating temperature in the storage reservoir, requirements for heating the expanding air, recuperation of heat, water treatment facilities, environmental details, and tar treatment, if required, shall all be included as good engineering practice. Details of magnetic clutches or hydraulic couplings are not included. The style or configuration of the storage reservoir is not considered to be pertinent. Also, there is no known limitation on the type of cycle or equipment, provided combustion or heat addition takes place at substantial pressure. However, the discussion herein centers about the more economical options, for example, low BTU gasification integrated with the combined Gas Turbine-Steam Turbine Cycle using coal, see FIG. 4.

The physical embodiments of the present invention may be varied. Chief among such variations are the sources of heat to operate the main gas turbine. Such direct sources as heated gases or combustion products of gaseous liquid, and solid fuels may serve this requirement. Alternatively, such indirect sources as heat exchangers, introducing heat from sources such as nuclear reactors, fluidized bed combustion, or indirect fired air heaters may be used.

One alternative to the systems or apparatus illustrated is that the indirect heat exchangers are used first to recover heat from the exhaust from the heat engine and then used to supply the air for combustion for further indirect heating of the input air to the heat engine. Another alternative results where the air compressor or compressors means uses one type of heat engine connected to and rotating an air compressor, and the generating means may be entirely different. For example, an MHD generator and engine may be compatible.

Importantly, the system may operate as a conventional unit without storage, the invention can, in the failure of the gas storage reservoir, generate power for an indefinite period of time. Most, if not all, prior air storage plans lack this feature.

Figure 3:
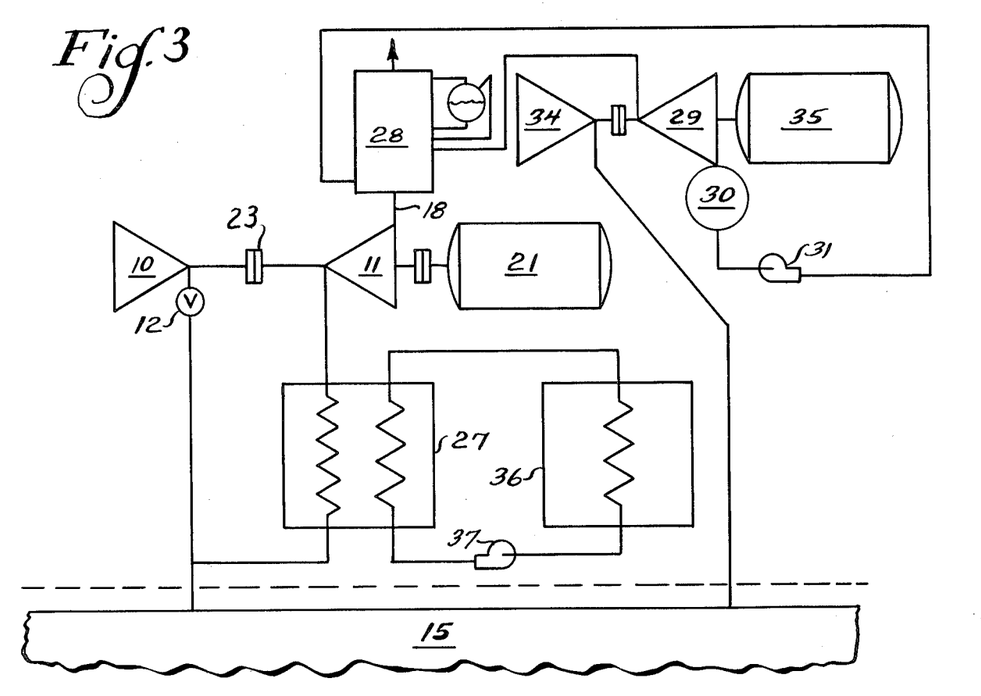
FIG. 3 is a schematic drawing of a further embodiment of the present invention including a cross compound combined cycle plant having an indirect air heater exchanger heated by a nuclear reactor.
Figure 4:
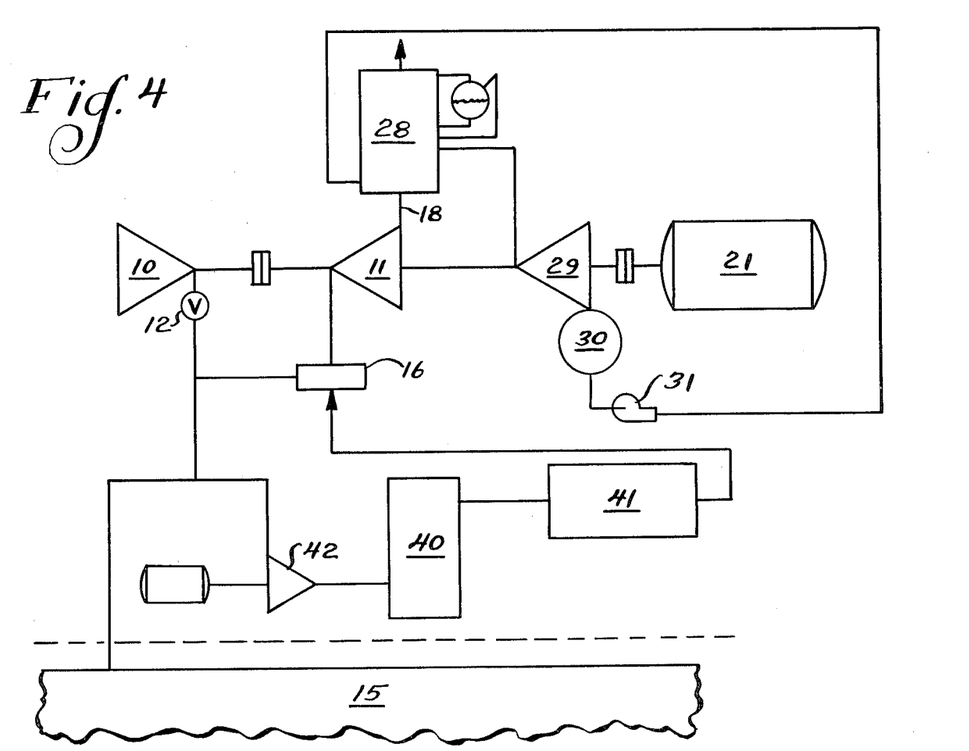
FIG. 4 is a schematic drawing of a low BTU gas tandem combined cycle plant processing coal to provide fuel gas.
Figure 5:
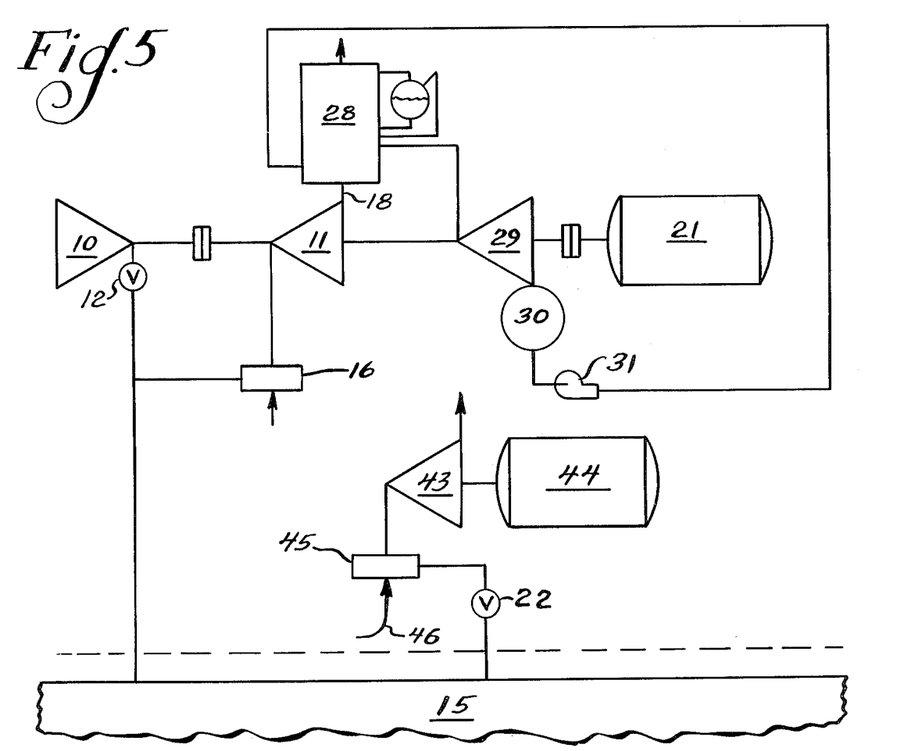
FIG. 5 is a schematic drawing of the apparatus required to illustrate the sharing of compressed air for peaking purposes in accordance with the present invention.

Considering the previous embodiments disclosed, useful work can be achieved through the addition of a waste heat cycle, as illustrated and shown in FIGS. 3, 4 and 5. This equipment maintains the flexibility of the simple cycle, because it is able to operate without the waste heat cycle during maintenance or start up or for other reasons. The waste heat boiler evaporates water to drive a steam turbine and the installation may have the additional alternate functions of compressing air and generating electricity.

The steam turbine cycle will incorporate such details of the art as are normally provided, such as means for controlling speed and flow, feed water heating and other features familiar to those skilled in the art.

The addition of the steam cycle in this embodiment of the invention however serves another purpose that is unconventional, as shown under the simple cycle, a multiplying effect of generator capacity can be achieved, allowing a maximum efficiency when generating approximately one third of the operating hours. Thus, when using the combined cycle, the two generators (see FIGS. 3, 4 and 5) have a combined capacity of nearly twice that of the conventional unit and a point of maximum efficiency is reached when generating an integrated output of effectively maximum output for 50% of the operating hours, which approximates the output demanded by the electric customers as a statistical entity.

A still further embodiment of the combined cycle plant is the tandem or one shaft alignment of the compressor, heat engine, steam turbine and generator, a feature illustrated and shown in FIG. 4. This embodiment achieves practicality due to the long continuous heat input to the heat engines of the operating method.

Now referring to FIG. 3, another embodiment of the present invention is the cross compound combined cycle plant wherein the unit consumes nuclear heat through an indirect heat exchanger. This embodinent is described as follows.

1. Air Supply

Air compressor 10 is either rotated continuously at constant speed by the gas turbine 11 or varied in output from full to zero output of compressed air or disconnected via coupling or clutch means 23. The compressor 10 serves to take atmospheric air and compress the air to a suitable pressure for the plant process. Again, a check valve 12 is provided to prevent back flow through the compressor 10 when the compressor is not supplying air.

2. Utilization

Compressed air from compressor 10 is heated in a heat exchanger 27. The compressed air rotates a gas or air turbine 11 and the discharge gases or air from this turbine are delivered through duct or conduit 18 to a waste heat boiler 28 which supplies steam to a steam turbine 29. Condenser 30, pumps 31 and feed water heaters, not shown, are provided with the steam cycle.

As may be readily understood this embodiment conserves heat in the exhaust gases through the waste heat steam cycle identified as 28, 29, 30, 31, which has its own shaft and drives an independent compressor 34 and generator 35 which may be switched in and out of service in a similar manner but independent of compressor 10 and generator 21.

This embodiment has the added flexibility of permitting easy removal of the waste heat cycle identified as items 28, 29, 30, 31, 35, 34, from operation while continuing to operate the combustion turbine 11, its air compressor 10 and/or generator 21 and heat supply by bypassing gases from duct 18 to a stack (not shown).

The nuclear reactor 36, which may be gas or liquid cooled, provides heat to the reactor cooling conduit which is delivered via pump or blower 37 to the indirect heat exchanger 27. There, compressed air from storage reservoir 15 or compressor 10 is heated and delivered to gas turbine 11. At this point the operation becomes identical to that described above with respect to FIG. 2, with the following exceptions. The compressor 34 and the generator 35 may be operated at different times and schedules than the compressor 10 and the generator 21. Also, this particular configuration possess essentially constant heat inputs to the gas turbine 11 and the steam turbine 29. This cycle operated at an electrical output approaching 50 percent capacity factor requires a nuclear reactor system of approximately one-half that of the conventional nuclear plant, for the same rate of electrical production.

Now referring to FIG. 4, a low BTU gas fired tanden combined cycle plant embodiment is illustrated as follows.

A gasifier 40 and a purification system 41 process coal continuously and remove mineral wastes and sulfur compounds to thereby supply clean fuel gas to burner 16. A gas turbine 11 supplies energy to an air compressor means 10 both for compressing of air to storage and for combustion requirements of the gas turbine.

The booster compressor 42 provides the additional pressure required to overcome the resistance of the gasifier and purification systems and produce the desired flow therethrough. Flue gases from the gas turbine 11 are conducted through duct or conduit 18 to waste heat boiler 28 and to a stack or chimney (not shown), Steam is raised in waste heat boiler 28 which drives a steam turbine cycle identified as items 29, 30 and 31. Gas turbine 11 and steam turbine 29 are connected by a common shaft to an air compressor 10 and generator 21. By rotation of the common shaft, energy is transmitted to either the air compressor or the generator thus producing compressed air for storage or generating electricity. For maximum output, the compressor 10 and the gas-steam turbines 11 and 29 will operate at one period charging air to the storage reservoir 15 and the gas-steam turbines 11 and 29 and generator 21 will operate at other periods withdrawing air therefrom. The waste heat cycle (28, 29, 30, 31), and the booster compressor 42, gasifier 40, burner 16 and gas turbine 41 will operate continuously. However, the arrangement illustrated, and only one of several possible, allows both air compression and withdrawal simultaneously. If adequate cooling is provided for the air compressor 10 and the generator 21, need for couplings or disconnecting clutches are eliminated. Again, check valve 12 operates at any time that the air compressor 10 fails to overcome the pressure in the reservoir 15 thus sealing the air compressor from reverse flow.

It should be noted that this unique embodiment provides a system wherein the fuel supply system for a non storage unit is expensive but which utilizes low cost fuel. This storage unit will have savings which are quite large because the entire expensive fuel system may be smaller. For a maximum output of 50% capacity factor of the generator 21, the fuel supply system and heat engines, identified as items 42, 40, 41, 16, 11, 17, 28, 29, 30 and 31, are approximately 50% of that provided for the conventional unit. There are also substantial savings, in excess of ten percent possible in coal handling and ash handling facilities.

In FIG. 5 the sharing of compressed air storage for electrical peaking functions may be described as follows.

It has been demonstrated that an economical, efficient, combined cycle plant using low cost fuels or heat input, using this method, may be operated continuously compressing air at maximum rate approximating 50% of the time, thus effecting a generation at twice capacity for approximately 50% of the time.

By the purchase and installation of an additional low cost gas turbine 43 and generator 44, in parallel with the combined cycle plants previously described, a large emergency or peaking unit capability can be developed. A premium fuel other than that of the original low cost fuel is required for the burner 45. No additional compressor is used. For example, if one selects natural gas or oil, the added peaker would consist of a fuel supply 46, a gas turbine 43 and a generator 44. Assuming that each fuel supply and heat engine could normally serve a conventional unit of one hundred megawatts, the combined cycle would supply 200 megawatts for 50% of the time, as previously described, and the simple cycle as previously mentioned will provide 300 megawatts for one third of the time. Under this arrangement with primary heat engines of roughly 100 megawatts each, 500 megawatts of capacity can be provided for approximately one third of the time. However, this is limited by the quantity of air that can be produced by the combined cycle.

This additional capacity is readily shown by the following description. For example, a 12 hours compression cycle and 12 hours of generation cycle by the combined cycle 200 mw. generator is assumed for a daily cycle. This cycle may be replaced by eight hours of joint operation of the combined cycle and the peaking unit for a maximum of 500 mw. for eight hours. Thus 12 times 200 or 2400 mw. hours can be replaced by 8 times 500 or 4000 mw. hours by using premium fuel, economical storage, and generating capacity. The additional air is provided by the low cost operation of the combined cycle plant.

A further example using two simple cycle units, with heat engines nominally 100 megawatts each, sharing air in a similar fashion will produce 600 megawatts for approximately twenty percent of the time.

It is an obvious extension of the present invention to use modular construction presently known in the art in which multiple gas turbine-compressor-generator simple cycle plants may each exhaust into a common duct, thus driving or supplying a larger waste heat steam cycle. This would use a common fuel supply adequate to supply all gas turbines necessary for full load operation of the waste heat cycle. The advantages of this embodiment are the anticipated longer term high availability of the waste heat cycle and the opportunity to use and economically maintain smaller primary heat engines of lower reliability.

Figure 6:
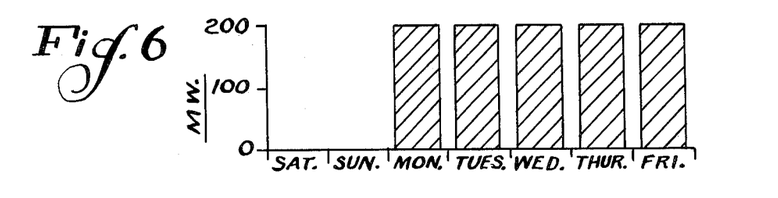
FIGS. 6 and 7 are charts illustrating, respectively, one schedule of operation of a conventional peaking unit in which electricity is generated approximately 16.8 hours during the day portion of five days per week and the rate by which fuel is consumed during this same period coincidentally with said generation.
Figure 7:
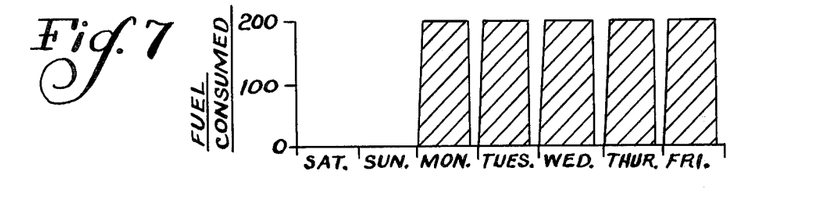
Figure 8:
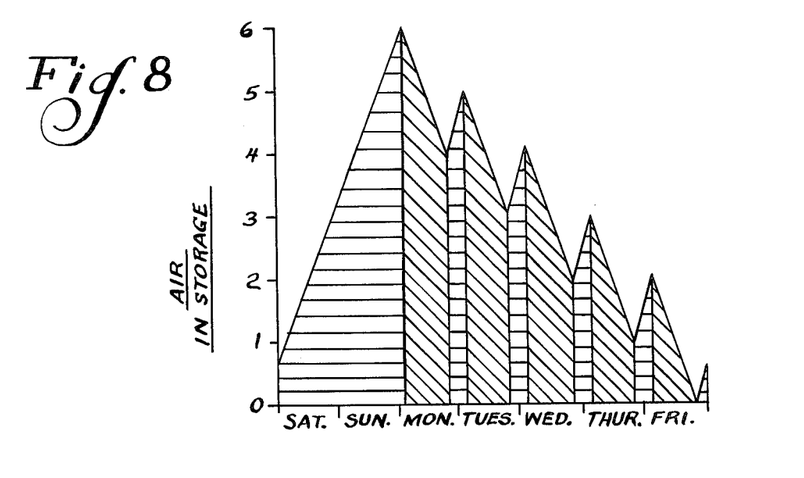
FIG. 8 is a chart illustrating the operation of the present invention showing the air accumulated in storage during a weekly electrical generation cycle of 16.8 hours, 5 days per week for a pattern identical to FIG. 6.
Figure 9:
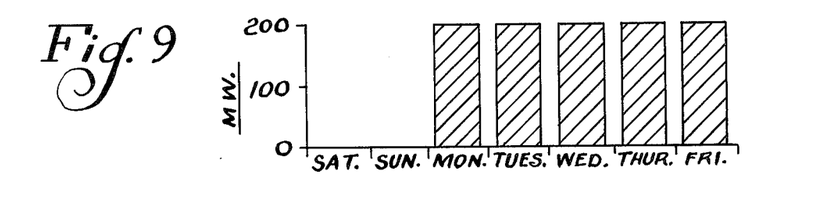
FIG. 9 is a chart illustrating the corresponding output of generation of the represented cycle in accordance with the present invention for a pattern identical to FIG. 8.
Figure 10:
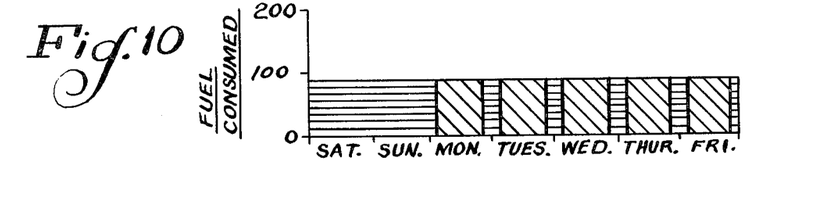
FIG. 10 is a chart illustrating the fuel consumed by the present invention during the weekly cycle as described in FIGS. 8 through 10.

FIGS. 8, 9, 10 are presented to illustrate one example of the operation possible with one embodiment of the present invention and a comparison with present technology, as illustrated in FIGS. 6 and 7.

To illustrate the unique capability of the present invention, disregard the loading time of the generator but assume that the goal is to operate a conventional generating unit approximately 16.8 hours per day and the five week days of a week, a condition illustrated in FIG. 6 and FIG. 7. The conventional unit is forced to synchronize the requirements of output with fuel input in time and amount, and will have additional losses of time and energy, as shown in FIG. 7. Importantly, a relative fuel input capacity of 200 units is required to produce 200 mw's of output.

The present invention uses compressed air as an inventory of incomplete production and FIG. 8 illustrates by chart a method of managing this inventory by storing energy and then combining this energy with fuel to produce electrical power. Because the fuel plant and heat engine are essentially doing a first operation of compressing air 50% of the time and a second operation of generating electricity 50% of the time, the horizontally cross hatched areas show compressed air being accumulated in storage. The diagonal cross hatching shows times and relative amounts of withdrawal for further processing. FIG. 9 illustrates the same desired outputs as shown in FIG. 6 but FIG. 10 illustrates the fuel input rate to be reduced by more than half. This relationship holds for a unit operating at approximately 50% capacity factor with respect to generator output and it will be seen that major components of plant will be much reduced in size. In the example charted, the air compressor and the generator are closely matched in that the excess air available for storage is accumulated approximately hour for hour of generation. Thus, there is no compressor operation during the period of generation. The final output of the unit is essentially doubled with respect to a normal plant without storage or the fuel plant is roughly one half size. Also, because there are reduced losses due to start up, shut down and partial loads, there are additional savings which effectively allow further reductions in plant size.

Figure 11:
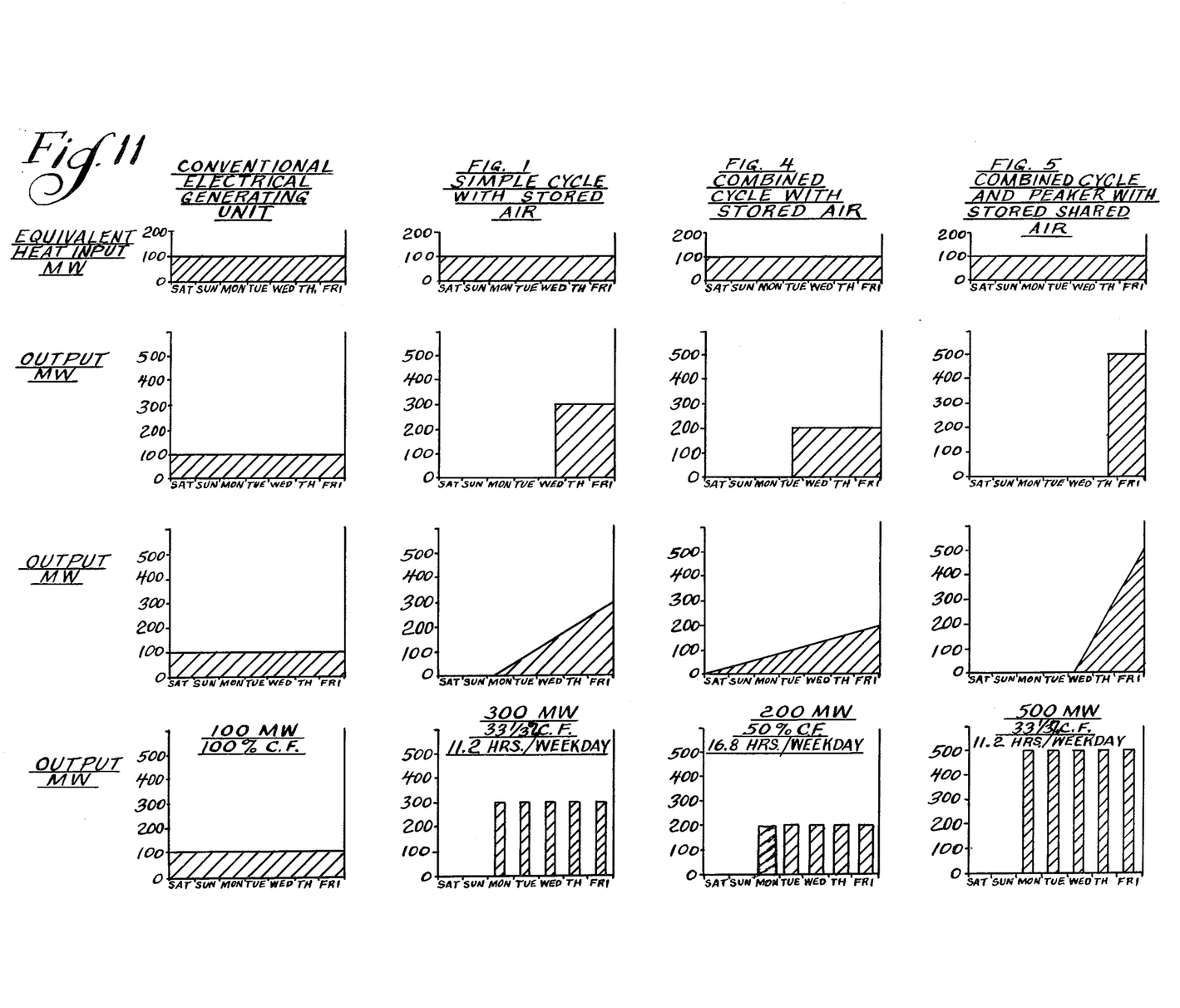
FIG. 11 is a composite chart illustrating examples of weekly cycles at constant heat input for a conventional electric generating unit and for embodiments of the present invention.

FIG. 11 is a chart depicting fuel input and generator output for weekly periods of time for a conventional unit and for three energy output patterns of the present invention operating under the condition of maximum heat input continuously. It should be noted that the output is exactly equal to the input for the conventional unit shown in Column 1. It is impossible for prior art generation schemes, using compressed air storage, to operate at maximum continuous fuel or heat input with the flexibility and economy of this invention.

For the simple cycle plant previously described with respect to FIG. 1, proceeding vertically down Column 2 of FIG. 11, with constant fuel input one can see a block of output of 3 times the rate of that for the conventional unit but for one third of the time. This represents a capacity factor of one third of the generator rating. The next chart shows one possible output sequence increasing the load constantly from zero to maximum load. And the bottom illustration shows production for a weekly cycle of 5 equal weekday periods at maximum output. These are of course shown at one third capacity factor which amounts to generation at maximum output for approximately eleven hours per week day.

Column 3 of FIG. 11, charts the effect of operating the combined cycle plant, previously described with respect to FIG. 4. For a constant maximum heat input of 100 mw. equivalent, 200 mw. can be achieved for 50% of the time, a 50% capacity factor of the generator, or 5 week day periods of nearly 17 hours per day at a maximum output of 200 mw., a rate twice that of the conventional generating unit.

Column 4 of FIG. 11 charts the effect of sharing air by using the combined cycle plant and a peaker, previously described with respect to FIG. 5. As depicted, both plants generating electricity at the same time will produce 500 mws of capacity for one third of the time or about eleven hours per week day.

FIG. 11 and the graphic charts are stylized to illustrate the operating modes possible, with the actual operation not limited to those shown. Importantly, considerable flexibility is possible when meeting an irregular demand for output.

As set forth above, applications where variable power output and less variable input have been described. This has probable effect only on the integrated costs of power.

Plainly, the present inventive process and apparatus works on the storage of high pressure gas and the compression from a lower pressure. Many processes begin with atmospheric pressure. However, by working between two higher pressures, for example, between the pressures of the natural gas pipeline and the high pressure gas storage reservoir normally used by the gas utility, gas compression into the reservoir can be accomplished by the invention with indirect heating using inexpensive fuels. Thus, scarce natural gas can be saved. In addition, load leveling and increased flexibility of the pipeline pressure can be practiced as well as the production of exonomical electrical generation as a by-product.

What has been described therefore is an invention which can utilize state of the art machinery, conserve scarce fuel resources and capital with capital equipment being reduced by one-third or more. Additionally, the energy conversion cycle is 10–30% more efficient than the same cycle without storage, with efficiency of gas storage approaching 100%.

For example, one operating method for generating electricity where the apparatus or unit includes a heat source, a fuel supply system and a heat engine which compresses gas may be described as follows. When the unit is operated continuously with compressed gas storage, the maximum integrated output of the electrical generators which may be, optionally, at a rate of 2, 3, 5, or 6 times larger than that of the nominal generator normally connected to the heat engine of the nonstorage unit. In such instances, the corresponding generation and full output of the present invention is limited to 50, 33⅓, 33⅓, or 20 percent of the time and the compressed gas will be accumulated in the storage reservoir for 50, 66⅔, 66⅔, or 80 percent of the time with maximum diversion to storage.

Furthermore, in the present invention, the use and the cost of using storage is not dependant upon off peak power being available. Also in the present invention thermal stresses are reduced, the use of premium fuel is reduced, and control dynamics are minimized. Moreover, the equipment is versatile and can be used for peaking with the most efficient point of operation of the apparatus designed to approximate the electrical generation system capacity factor while maintaining a spinning reserve without loss over a long period of time thus increasing the availability of emergency power.

Furthermore, it is possible to apply the present invention to the day-to-day operation of gasifiers and gas purification processes, as practiced by gas utilities and petrochemical processing plants which operate at steady loads, to the operation of a variable electric plant. This permits the generation of power having lessened environmental impact.

Also, the present invention requires a reduced need for specialized equipment as is presently required in electric power generation. Such power generation can be facilitated by the use of modules and by sharing the compressed air stored by the basic invention. Peakers using premium fuel may be incorporated at substantial savings of premium fuel, capital and operating cost. And, the cycling units of the power generation apparatus operate at greatest economy at a capacity factor which is matched closely with the utility system, with the cycling units utilizing the storage reservoir independent of the operation and costs of the other units in the electrical system.

I claim:

1. In a power generating apparatus having first and second heat engine means and a compressor directly and mechanically connected to the first heat engine means, the method of generating power in accordance with a variable demand, including the steps of:

establishing a storage reservoir of compressed gas by the continuous operation of said first heat engine means driving the compressor;

operating the first heat engine means continuously at a constant work output and at a constant heat and gas flow input rate, said work output substantially conforming to the average rate of demand of said second heat engine means to generate power, withdrawing intermittently said stored portion of said compressed gas in said reservoir to a second heat engine means to increase the generation of power as required to satisfy such a variable demand while maintaining said first heat engine means at a constant work output, and generating power by a power receiving means driven by said second heat engine means, said power receiving means adapted to accept up to the full load output of said second heat engine means, with said second heat engine means withdrawing intermittently said stored portion of said compressed gas from said storage reservoir.

2. The method of generating power in accordance with claim 1 wherein in the step of operating said first heat engine means continuously at a constant work output substantially conforming to the average rate of demand, said average rate of demand of said work output of said first heat engine means is calculated over a period of time of at least one week and withdrawing of said stored portion of said compressed gas from said storage reservoir to said second heat engine means shall constitute a portion of said period of time.

3. The method of generating power in accordance with claim 2 wherein said portion of said period of time is at least a fraction of one day of at least one week.

4. The method of generating power in accordance with claim 2 wherein the size of said second heat engine means utilizes all the gas stored during said period of time of at least one week during the portion of said period of at least one day of at least one week.

5. The method of generating power in accordance with claim 1 further including the step of heating the compressed gas upon withdrawal from the storage reservoir of said stored portion of said compressed gas.

6. The method of generating power in accordance with claim 1 wherein said heat engine means and said second heat engine means are each of a predetermined size which provide rotational output to said compressor and to said power receiving means respectively, and selected from a group comprising coal fired steam-turbine cycles, nuclear fired-turbine cycles, gas turbine and combined cycles.

7. The method of generating power in accordance with claim 1 wherein said compressed gas is air.

8. A power generating apparatus operable with variable power output including in combination, a storage reservoir of compressed gas, at least one compressor mechanically coupled to and driven by a first heat engine means whereby said at least one compressor and said first heat engine means operate continuously at constant work output and at a constant heat and gas flow input rate to deliver at least a portion of the compressed gas to said storage reservoir over a period of time of at least one week to establish a stored portion of said compressed gas in said storage reservoir, at least one second heat engine means adapted to maximize its power output for a portion of said period of time of at least one week, whereby said second heat engine means receives at least a portion of its energy from said stored portion of said compressed gas withdrawn from said storage reservoir during said portion of time of at least one week, and at least one power receiving means driven by said second heat engine means, said power receiving means being adapted to maximize the power output of said second heat engine means.

9. The power generating apparatus in accordance with claim 8 wherein said portion of said period of time of at least one week is at least a fraction of one day of said at least one week.

* * * * *